Aug. 13, 1957  S. G. MAYERNIK  2,802,384
TOOL FOR TURNING RINGS IN GATE VALVES
Filed Sept. 28, 1955  2 Sheets-Sheet 1

Stephen G. Mayernik
INVENTOR.

BY *Michael Dofney*

ATTORNEY

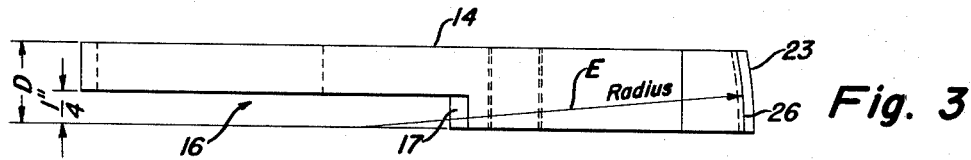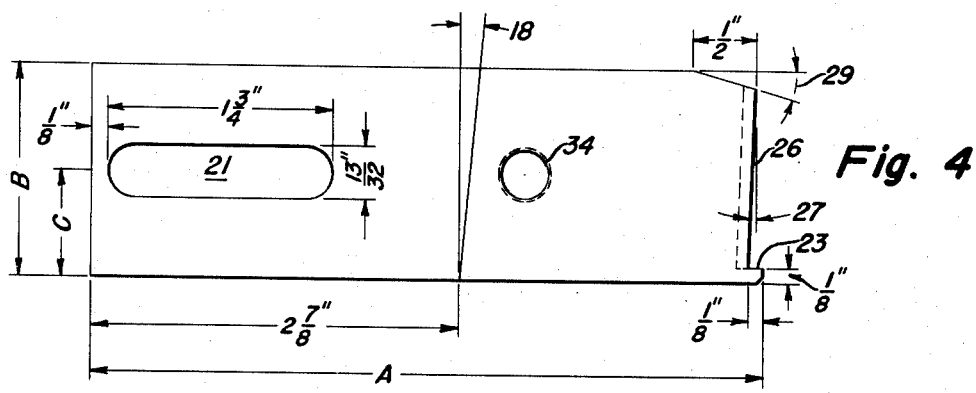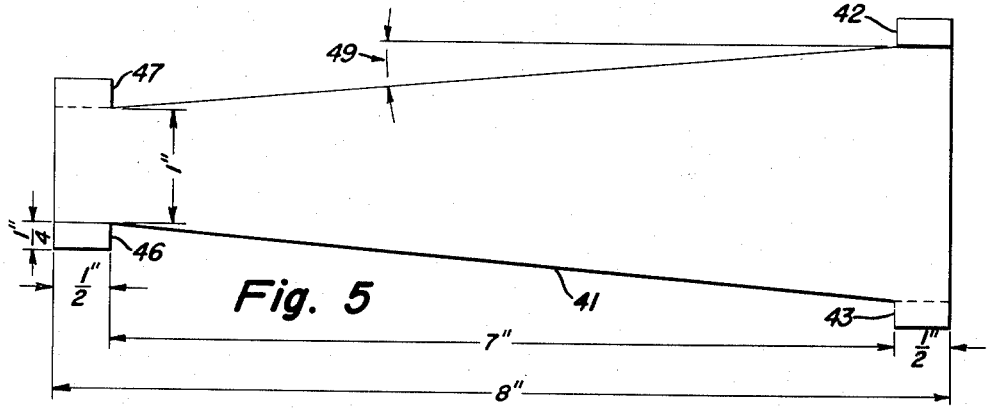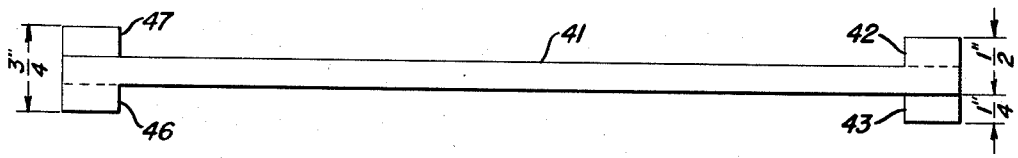

United States Patent Office 2,802,384
Patented Aug. 13, 1957

2,802,384

TOOL FOR TURNING RINGS IN GATE VALVES

Stephen G. Mayernik, Whiting, Ind., assignor to Standard Oil Company, Chicago, Ill., a corporation of Indiana Application September 28, 1955, Serial No. 537,101

4 Claims. (Cl. 81—72)

This invention relates to the maintenance, particularly assembly and disassembly, of gate valves. More particularly the invention is concerned with a tool which permits rapid and easy removal and insertion of sealing rings in gate valve bodies.

In gate valves, the closing of the valve is obtained by contact of the gate with sealing surfaces. These sealing surfaces are provided by means of flange-type rings provided with a smooth surface on the interior for contact with the surface of the gate. These sealing surface flanges, commonly called sealing rings, are threaded into the valve body.

The removal of these sealing rings from a valve which has seen considerable service, particularly in corrosive service, is usually a problem. Even in relatively clean service such as steam lines, the sealing ring is usually corroded in places and extreme measures are needed to remove the ring. At times the ring is removed only with so much damage as to require junking the ring and in some cases the valve body is damaged sufficiently as to require junking.

Sealing rings are provided with either slots cut on the interior periphery of the ring perpendicular to the sealing surface or more commonly with two, three, or four projections or lugs extending from the inner surface. These slots or lugs are intended to provide a means for holding bars to which a turning force can be applied. The internal diameter of sealing rings often varies with valves from the same manufacturer which ostensibly have the same nominal valve size; it is customary for valves of the same nominal size to have different ring diameters when purchased from different manufacturers. When utilizing a bar to remove a sealing ring provided with lugs, it is usual to have to grind a bar to fit the particular sealing ring present in the valve which is undergoing maintenance or reconditioning. As the lugs and slots are subject to corrosion and erosion, it is difficult at times to remove the ring even when a bar has been ground to the proper diameter because of the difficulty of getting a tight fit within the ring. Injuries have been incurred when men were applying stress by means of a long bar to a sleeve wrench and thence to a bar butting on the two lugs in a tightly corroded ring.

An object of the invention is an improvement in tools available for assembly and disassembly of gate valves. A particular object is a simple tool for readily inserting and removing sealing rings from gate valve bodies. A particular object is a tool which may be utilized to remove and/or insert gate valve sealing rings of a particular nominal size, regardless of variation in actual size. A further object is a tool for removing and inserting sealing rings into gate valves which is adaptable to rings wherein the lugs provided in the rings are badly worn. Other objects will become apparent in the course of the detailed description.

Figure 3 is a plan view of a wing member utilized in the embodiment of Figure 1.

Figure 4 is an elevation view of the wing member set out in Figure 3.

Figure 5 is an elevation view of the wedge member utilized in Figure 1.

Figure 6 is a side view of the wedge member of Figure 5.

The invention is described in connection with the annexed drawings which form a part of this specification. It is to be understood that other embodiments of the tool of this invention may be readily devised and it is intended that these modifications and embodiments are within the scope of the claimed invention.

Figure 1:
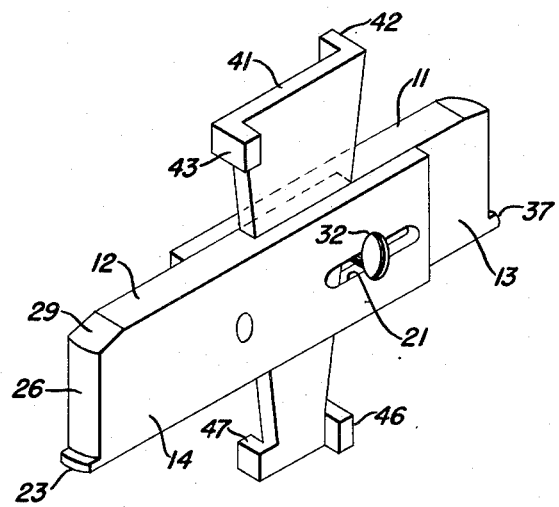
Figure 1 shows a perspective drawing of one embodiment of the tool of the invention suitable for removing sealing rings provided with lugs.

In Figure 1, wing members 11 and 12 form a laterally expansible combination which fits into the seal ring. Sufficient lateral movement is possible along the longitudinal dimension of wing members 11 and 12 that seal rings of the same nominal diameter but different axial internal diameters made to be handled.

Each wing member 11 and 12 comprises a bar-like member 13 and 14 respectively. The relative width and thickness of the bar members will be determined by the size of the seal rings to be handled and also by the amount of force which will normally have to be applied to the seal ring to unseat it. The two wing members 11 and 12 are identical in construction and hereafter only wing member 12 will be described in reference to Figure 1. It is to be understood that the same terms of description will apply to Figure 2.

Bar-like member 14 is described not only in reference to Figure 1, but also Figures 3 and 4. Bar-like member 14 is provided with a cutout portion 16 which may be described as a half-lap cut, such as is used by carpenters in making a half-lap joint. The half-lap cutout portion terminates in a shoulder 17. Shoulder 17 may be perpendicular to the length of bar-like member 14 or it may be provided with a slope to the length of member 14. This slope is hereinafter described as a tapered shoulder 18. In the particular embodiment set out herein, the taper of tapered shoulder 18 is five degrees.

Bar-like member 14 is provided with a longitudinal slot 21 which slot is positioned in the portion of the member 14 containing the half-lap cutout. In this embodiment, slot 21 is positioned near the end of member 14. Slot 21 is of such a length that it will permit the two wing members to be adjusted to fit securely inside the sealing ring and also will permit closure of the two wing members for easy removal from within the sealing ring. In this embodiment, the distance between the end of bar-like member 14 and the end of slot 21 is 1/8 inch. Slot 21 is 1¾ inches long and 13/32 inch wide. The half-lap cutout portion is 2⅞ inches long at the side of bar member 14 where the taper begins. The width of bar-like member 14 is designated B in this embodiment and the thickness is designated D. The total length of bar-like member 14 is designated A. The location of the slot 21 is set out as C.

Bar-like member 14 has a flange-like extension projecting from its rim at the end opposite that portion containing the half-lap cutout. This flange-like member is designated 23 in Figures 1 and 4. Flange-like extension 23 extends across the width D of bar-like member 14. In this particular embodiment, the flange-like member has an extension of 1/8 inch and is 1/8 inch in depth. The function of flange-like extension 23 is to position and hold the wing members against the sealing surfaces of the sealing ring.

A beveled surface 26 extends from the base of flange-like member 23 substantially perpendicular thereto. Beveled surface 26 may extend the full width B of bar-like member 14 or may be terminated at a point below the edge opposite that of the rim containing flange-like member 23. In this embodiment, a slight inward taper 27 is given to beveled surface 26 in order to aid in a firm contact of the beveled surface 26 against the inner surface of the seal ring. In this embodiment, the taper 27 is 2 degrees. Beveled surface 26 is preferably curvilinear, with the curvilinearity such that surface 26 will have essentially the same curvature as the curvature of the inner surface of the seal ring, i. e., the curvilinear surface will have essentially the same radius or radial distance as the circle representing the inner surface of the seal ring.

When the gate valve seal rings to be maintained are provided with slots, surface 26 may be flat or it may be provided with a curvilinear surface. The center point of the arc forming that curvilinear surface is preferably the center point of the thickness D of bar member 14.

When the gate valve seal rings to be maintained are provided with lugs on the inner surface of the seal ring, it is preferred that the wing members will butt firmly against the ring and also against the lug provided thereon. In order to permit this butting, which assists greatly in the removal and insertion of rings having worn lugs, the curvilinear surface is defined by having the center point of the radius, E, in Figure 3 at the side of bar-member 14, the radial distance E being measured along the side of bar-like member 14, which side is to butt against the lug of the seal ring.

In this embodiment, to avoid deformation of the end of the surface 26, a bevel 29 has been provided at the side of the bar-like member 14 opposite flange-like extension 23. In this embodiment, the bevel amounts to 15 degrees and has a length along the side of the bar member of ½ inch.

The two wing members 11 and 12 are joined together by means 31 and 32 which extend through slot 21 in bar-like member 14 and through the slot in bar-like member 13. In this embodiment, a threaded opening 34 has been provided in bar-like member 14. The means for joining the two wing members, in this embodiment, consists of a bolt which passes through the slot in bar-like member 11 and is threaded into opening 34 a distance sufficient to permit a sliding lateral movement between wing members 11 and 12. In this embodiment, the bolt 31 was hammered at the end extending through bar-like member 14 to make it a permanent fit. It is obvious that other methods of joining wing members 11 and 12 may be used to obtain the same result.

Wing members 11 and 12 are joined in such a manner that flange-like extensions 23 and 37 are in the same horizontal plane, in other words, on the same side of the combination of the two wing members 11 and 12. The surface 26 on wing member 12 and the corresponding surface on wing member 11 have been so cut that these are portions of the circumference of the same circle.

When wing members 11 and 12 are joined in this manner, a mortise-like opening is formed by the two half-lap cut away portions. In this embodiment, the mortise-like opening has tapered sides corresponding to taper 18 on bar member 14 and the corresponding taper on bar member 13. In order to secure the wing members firmly against the inner surface of the seal ring, wedge-like member 41 is positioned in the mortise-like opening formed by said wing members. Wedge-like member 41 is of a length such that it extends an appreciable distance above and below the upper side and lower side of the combined wing members. Although various methods may be utilized to keep wedge-like member 41 securely in the mortise-like opening, in this embodiment, wedge-like member 41 is provided with lugs 42 and 43 at its upper end and lugs 46 and 47 at its lower end. With care in handling of the tool, no provision such as these lugs need be made.

In Figures 5 and 6, there is set out an elevation and side view dimensions of the wedge-like member 41 utilized in this particular embodiment. In Figure 5, the wedge-like member 41 is 8 inches in overall length. Each of said lugs is one-half inch in length and ¼ inch in thickness. The wedge-like member itself is ¼ inch thick. At its narrowest point, the width of wedge-like member 41 is one inch and the taper 49 is 5 degrees.

The dimensions A, B, C, D and E will vary with the nominal size of the valve to be maintained. The dimensions for valves of 6, 8, 10 and 12 inches are set out in the table below.

| Size | Dimension | | | | |
|---|---|---|---|---|---|
| | A | B | C | D | E |
| | Inches | Inches | Inches | Inches | Inches |
| 6" | 5¼ | 1⅝ | 1³⁄₁₆ | ⅝ | 3 |
| 8" | 6⅛ | 1¾ | ⅞ | ⅝ | 4 |
| 10" | 7 | 1⅞ | 1⁵⁄₁₆ | ¾ | 5 |
| 12" | 8⅛ | 2 | 1 | ¾ | 6 |

Figure 2:
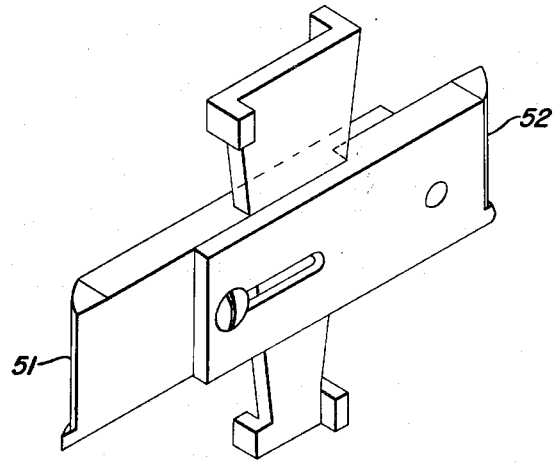
Figure 2 shows an embodiment of the tool of this invention suitable for inserting sealing rings into gate valve bodies.

In Figure 1 there is set out an embodiment for removing seal rings from valves. Figure 2 shows a corresponding embodiment for inserting seal rings into valves. It is seen that the two tools are identical except for the manner in which the curvilinear surfaces 51 and 52 are formed as compared to surface 26 on the corresponding surface on wing member 11. Although the change in the curvilinear surface as set out in Figures 1 and 2 requires that two tools be available to the pipe fitter, in order to permit both insertion and removal of seal rings, it has been found that with badly worn lugs the use of the two tools is not only speedier, but a definite safety feature.

The use of the tool of this invention in the maintenance of gate valves is described herein below. The gate valve which may be, for example, 8 inches nominal size, is removed from its location in pipe lines and may be brought into a shop for maintenance or may be disassembled on the site. As a first step, the gate and its stem are removed from the valve body providing unencumbered passage through the stem portion of the valve body for the removal of the seal rings after they have been unthreaded. The valve body containing the sealing rings is set on end so that the pipe fitter is looking down along the fluid passage way of the valve body. The valve body is fastened securely to prevent shifting of the valve body during the application of force in the removal of the now upper positioned seal ring. A tool having the proper size corresponding to the embodiment set out in Figure 1 is inserted through the upper portion of the valve body into the gate chamber. Flange-like extensions 23 and 37 are brought against the sealing surface of the ring and the curvilinear surface 26 and its corresponding surface are brought against the inner surface of the sealing ring with the side of the bar-like members 13 and 14 along which the radial distance was measured butted firmly against the lugs on the sealing ring. Wedge-like member 41 is, by hand blow, forced firmly into the tapered opening provided by the two wing members and locks the curvilinear surface against the inner surface of the sealing ring. A sleeve wrench which consists, for example, of a 4 inch I. D. heavy walled piece of pipe provided with two slots in one end and two circular openings near the other end is placed over the upper end of wedge-like member 41 and seated on wing members 11 and 12. The sleeve wrench is long enough to protrude above the end of the valve body. A long bar is passed through the holes in the sleeve wrench and sufficient force is applied to the bar to unseat the sealing ring and to unthread it. The last turn or two of the removal process may readily be done by hand after removing the sleeve wrench. The tool is disengaged from the ring and the ring is withdrawn from the valve body by way of the stem opening.

The second sealing ring is removed by turning the valve body over so that the sealing ring is now in the upper position above the ring which has been already removed. The above process is then repeated to remove the ring.

When it is desired to reinsert the rings into the valve or new rings, the valve body is securely fastened in a manner similar to that when removing rings. The ring in the upper position is started by hand and is spun until hand pressure will no longer tighten it. The inserting tool as set out in Figure 2 is then introduced into the valve body and fitted against the lugs and locked in place by striking the wedge-like member. By use of the sleeve wrench and bar the ring is then seated tightly in the valve body. The tool is removed, the valve body is turned over and the second ring is then inserted in an identical manner.

It can be readily seen that the tool set out herein permits the removal of the most badly corroded seal rings with little or no hazard to the pipe fitters and by the uniform application of disengaging force with little or no damage to the sealing ring itself and particularly no damage to the valve body. Use in a large salvage yard for a period of some months has shown conclusively that not only does the tool permit economies in the maintenance of valves, but it has resulted in the more important benefit of virtually eliminating accidents in this work.

Thus having described the invention, what is claimed is:

1. A tool used for removal or insertion of seal rings in gate valves, which tool includes two wing members, each of said wing members comprising a bar-like member provided with a half-lap cutout portion across the width of each bar-like member at one end thereof, each bar-like member being provided with a longitudinal slot in the portion containing said half-lap cutout, a flange-like extension projecting from the rim of said bar-like member at the end opposite that containing said half-lap cutout portion and a beveled surface extending from the base of said flange-like member substantially perpendicular thereto across the width of said bar-like member, means extending through said longitudinal slots for joining said wing members in a manner permitting movement along the longitudinal axis of said slots, simultaneously forming a mortise-like opening contained by said two wing members by superposing said winged members and a wedge-like member positioned in said mortise-like opening.

2. The tool of claim 1 wherein said wedge-like member is provided with lugs at the ends thereof, said lugs being of a size sufficient to keep said wedge-like member positioned in said mortise-like opening.

3. The tool of claim 1 wherein each of said half-lap cutout portions has a tapered shoulder such that a tapered mortise-like opening is formed having a taper essentially the same as the taper of said wedge-like member.

4. The tool of claim 1 wherein said beveled surface is curvilinear having a radius essentially that of the internal radius of the seal ring undergoing maintenance, said radial distance being measured along one side of said bar-like member.

References Cited in the file of this patent

UNITED STATES PATENTS

| | | |
|---|---|---|
| 1,046,517 | Weber | Dec. 10, 1912 |
| 2,421,665 | Umbdenstock | June 3, 1947 |
| 2,569,284 | Bower | Sept. 25, 1951 |
| 2,678,217 | King | May 11, 1954 |

FOREIGN PATENTS

| | | |
|---|---|---|
| 721,295 | Germany | Feb. 11, 1948 |
| 132,991 | Great Britain | Oct. 2, 1919 |